United States Patent
Ryan et al.

(10) Patent No.: US 10,327,157 B2
(45) Date of Patent: Jun. 18, 2019

(54) DYNAMICALLY TARGETING OPTIMIZATION OF NETWORK ELEMENTS

(71) Applicant: EDEN ROCK COMMUNICATIONS, LLC, Bothell, WA (US)

(72) Inventors: David James Ryan, Bothell, WA (US); Eamonn Gormley, Bothell, WA (US); Anthony Keng-San Wong, Bothell, WA (US); Stephan McLaughlin, Bothell, WA (US); Timothy Treptow, Bothell, WA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/225,348

(22) Filed: Mar. 25, 2014

(65) Prior Publication Data

US 2014/0287768 A1 Sep. 25, 2014

Related U.S. Application Data

(60) Provisional application No. 61/805,112, filed on Mar. 25, 2013.

(51) Int. Cl.
*H04W 24/02* (2009.01)

(52) U.S. Cl.
CPC .................. *H04W 24/02* (2013.01)

(58) Field of Classification Search
CPC ..... G06F 15/177; H04W 16/18; H04W 16/24; H04W 16/32; H04W 48/20
USPC ......... 709/221, 222; 715/735; 455/524, 525, 455/449, 446
See application file for complete search history.

(56) References Cited

U.S. PATENT DOCUMENTS

| 6,819,923 B1* | 11/2004 | Friman ................. H04W 8/245 370/331 |
| 8,175,603 B1 | 5/2012 | Hoole |
| 2006/0172759 A1 | 8/2006 | Ishihara |
| 2010/0216467 A1* | 8/2010 | Ryan ..................... H04W 24/04 455/435.1 |
| 2010/0216485 A1 | 8/2010 | Hoole |
| 2010/0278161 A1 | 11/2010 | Ore et al. |
| 2010/0299419 A1* | 11/2010 | Ramankutty et al. ........ 709/221 |
| 2011/0105139 A1* | 5/2011 | On ........................ H04W 16/10 455/453 |

(Continued)

OTHER PUBLICATIONS

International Search Report and Written Opinion for PCT/US2014/031782, filed Mar. 25, 2014.

*Primary Examiner* — Kamran Afshar
*Assistant Examiner* — Majid Syed

(57) ABSTRACT

Systems and methods for dynamically targeting optimization of network elements in a network are described. In some embodiments, the systems and methods identify one or more network elements (e.g., cells) that are newly added to a network that is associated with currently running automated network optimization processes, optionally group the identified one or more network elements into temporary element lists that are based on shared parameters for the one or more network elements, compare the one or more network elements and/or the temporary element lists to element inclusion policies of the automated network optimization processes, and update the automated network optimization processes based on the comparison.

20 Claims, 10 Drawing Sheets

(56) References Cited

U.S. PATENT DOCUMENTS

| | | | | |
|---|---|---|---|---|
| 2012/0028584 A1* | 2/2012 | Zhang | ............... | H04W 16/14 |
| | | | | 455/63.1 |
| 2012/0087269 A1 | 4/2012 | Hussein et al. | | |
| 2014/0162682 A1* | 6/2014 | Tafreshi | ............... | H04W 24/02 |
| | | | | 455/456.1 |
| 2015/0045008 A1* | 2/2015 | Karla | ............... | H04W 24/02 |
| | | | | 455/418 |

* cited by examiner

DYNAMICALLY TARGETING OPTIMIZATION OF NETWORK ELEMENTS

CROSS-REFERENCES TO RELATED APPLICATIONS

This application claims priority to U.S. Provisional Application No. 61/805,112, filed Mar. 25, 2013, entitled METHOD FOR DYNAMICALLY TARGETING AUTOMATED OPTIMIZATION PROCESSES TO NEWLY ADDED NETWORK ELEMENTS, which is hereby incorporated by reference in its entirety.

BACKGROUND

Wireless networks rely on a large number of individual base stations to provide high capacity wireless services over large coverage areas such as market areas (e.g., cities), surrounding residential areas (e.g., suburbs, counties), highway corridors and rural areas. Continuous radio connectivity across these large coverage areas is accomplished via user mobility from one base station to others as the user traverses the network's operating area. High reliability mobility in mobile wireless networks minimizes the number of dropped calls or other abnormal discontinuations of radio service to the supported users.

Self-Organizing or Self-Optimizing Network (SON) technology provides automated processes that support the configuration and optimization of communication networks. For example, SON optimization processes may continuously run on a network in order to continuously monitor and/or optimize the performance of the network and the network elements (e.g., base stations, cell sites, cells, and so on) in the network. SON processes may be limited in their reach in a network, where some SON processes only run for certain network elements (e.g., elements within a suburb), while other SON processes run for other network elements (e.g., elements along a highway corridor).

As networks evolve, cells and other network elements are added to different areas within a network in order to meet and satisfy the ever-changing communication and data transfer demands placed on the network. However, a changing network may cause problems with respect to the typical SON technology used to optimize performance of the network, because the optimization processes provided by the typical SON technology often rely on static definitions of network elements to target, leading to a suboptimal performance and/or configuration of the network and associated network elements, among other problems.

SUMMARY

Systems and methods for dynamically targeting optimization of network elements in a network are described. In some embodiments, the systems and methods identify one or more network elements (e.g., cells or base stations) that are newly added to a network that is associated with currently running automated network optimization processes, group the identified one or more network elements into temporary element lists that are based on shared parameters for the one or more network elements, compare the temporary element lists to element inclusion policies of the automated network optimization processes, and update the automated network optimization processes based on the comparison.

In some embodiments, the systems and methods include an element identification module that identifies one or more network elements that are newly added to a network that is associated with currently running automated network optimization processes, an element list module that groups the identified one or more network elements into temporary element lists that are based on shared parameters for the one or more network elements, a policy comparison module that compares the temporary element lists to element inclusion policies of the automated network optimization processes, and a process update module that updates the automated network optimization processes based on the comparison. For example, the process update module may update a target network element list with information identifying the one or more network elements that is contained in the temporary element lists, and target or direct the automated network optimization processes to network elements contained in the updated target network element list.

In some embodiments, the systems and methods generate temporary lists of new cells within a network that were added to the network after a set of self-optimizing network processes were initiated on cells within the network, each of the generated temporary lists grouping cells according to a common criterion, compare the temporary lists to target cell lists that group the cells within the network into management clusters, the management clusters being associated with at least one self-optimizing network process of the set of self-optimizing network processes, and update the target cell lists to include new cells based on a comparison of the temporary lists to the target cell lists. For example, the common parameter may be a certain geographical location that includes a cell, a certain carrier frequency via which a cell operates, and/or a hierarchy of cells within the network within which a cell is positioned.

DETAILED DESCRIPTION

Figure 1:
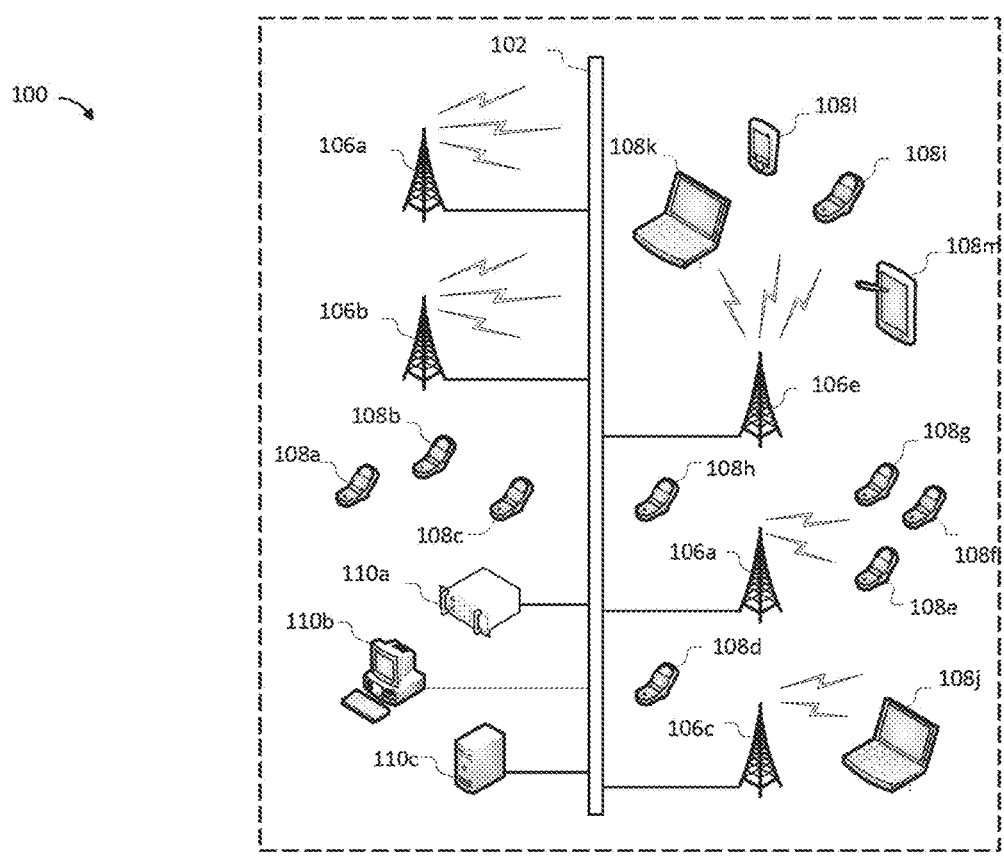
FIG. 1 is a block diagram illustrating a suitable network environment.

Systems and methods for dynamically targeting optimization of network elements in a network are described. For example, the systems and methods provide a target identification system that may identify a network element (e.g., a cell or base station) that is added to a network after the initiation of network optimization processes, add the network element to one or more temporary element lists that are based on the parameters associated with the network element (e.g., the geo-location of the element, the carrier frequency via which the network element operates and so on), compare the temporary element lists to element inclusion policies of the network optimization processes, and add the network element to the already initiated network optimization processes based on the comparison.

Thus, the target identification system may facilitate the targeting of specific SON automation processes to specific network elements while dynamically expanding the scope of the automation processes to include network elements that are newly added to a network after the automation processes are initiated and/or when they are running on a network, among other benefits.

In the following detailed description, reference is made to the accompanying drawings, which form a part of the description. The embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The technology can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term processor refers to one or more devices, circuits, and/or processing cores configured to process data, such as computer program instructions.

A detailed description of embodiments is provided below along with accompanying figures that illustrate the principles of the technology. The technology is described in connection with such embodiments, but the technology should not be limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of illustration and the technology may be practiced according to the claims without some or all of these specific details. For the purpose of clarity, technical material that is known in the technical fields related to the technology has not been described in detail so that the technology is not unnecessarily obscured.

Examples of the Network Environment

FIG. 1 illustrates an example network environment 100 within may include the target identification system. Any of the machines, databases, or devices shown in FIG. 1 and other Figures described herein may be implemented in a general-purpose computer modified (e.g., configured or programmed) by software to be a special-purpose computer to perform the functions described herein for that machine, database, or device. Moreover, any two or more of the machines, databases, or devices illustrated in FIG. 1 may be combined into a single machine, and the functions described herein for any single machine, database, or device may be subdivided among multiple machines, databases, or devices.

As depicted, the network environment 100 includes a data communications network 102, one or more base stations 106*a-e*, one or more network resource controllers 110*a-c*, and one or more User Equipment (UE) 108*a-m*, such as mobile or other computing devices. As used herein, the term "base station" refers to a wireless communications station provided in a location that serves as a hub of a wireless network. The base stations may be used with macrocells, microcells, picocells, and femtocells.

The data communications network 102 may include a backhaul portion that can facilitate distributed network communications between any of the network controller devices 110 *a-c* and any of the base stations 106*a-e*. Any of the network controller devices 110*a-c* may be a dedicated Network Resource Controller (NRC) that is provided remotely from the base stations or provided at the base station. Any of the network controller devices 110*a-c* may be a non-dedicated device that provides NRC functionality among others. The one or more UE 108*a-m* may include cell phone devices 108*a-i*, laptop computers 108*j-k*, handheld gaming units 108*l*, electronic book devices or tablet PCs 108*m*, and any other type of common portable wireless computing device that may be provided with wireless communications service by any of the base stations 106*a-e*.

The backhaul portion of a data communications network 102 may include intermediate links between a backbone of the network, which are generally wire line, and sub networks or base stations 106*a-e* located at the periphery of the network. For example, cellular user equipment (e.g., any of UE 108*a-m*) communicating with one or more base stations 106*a-e* may constitute a local sub network. The network connection between any of the base stations 106*a-e* and the rest of the world may initiate with a link to the backhaul portion of an access provider's communications network 102 (e.g., via a point of presence).

In some embodiments, the NRC has presence and functionality that may be defined by the processes it is capable of carrying out. Accordingly, the conceptual entity that is the NRC may be generally defined by its role in performing processes associated with embodiments of the present disclosure. Therefore, the NRC entity may be considered to be either a hardware component and/or a software component that is stored in computer readable media such as volatile or non-volatile memories of one or more communicating device(s) within the networked computing system 100.

In some embodiments, any of the network controller devices 110*a-c* and/or base stations 106*a-e* may function independently or collaboratively to implement processes associated with various embodiments of the present disclosure described herein. Further, processes for dynamically optimizing network elements of a network, such as newly added network element, may be carried out via various communication protocols, such as those associated with modern Global Systems for Mobile (GSM), Universal Mobile Telecommunications System (UMTS), Long Term Evolution (LTE) network infrastructures, and so on.

In accordance with a standard GSM network, any of the network controller devices 110*a-c* (NRC devices or other devices optionally having NRC functionality) may be associated with a base station controller (BSC), a mobile switching center (MSC), or any other common service provider control device known in the art, such as a radio resource manager (RRM). In accordance with a standard UMTS network, any of the network controller devices 110*a-c* (optionally having NRC functionality) may be associated with a NRC, a serving GPRS support node (SGSN), or any other common network controller device known in the art, such as an RRM. In accordance with a standard LTE network, any of the network controller devices 110*a-c* (optionally having NRC functionality) may be associated with an eNodeB base station, a mobility management entity (MME), or any other common network controller device known in the art, such as an RRM.

In some embodiments, any of the network controller devices 110a-c, the base stations 106a-e, as well as any of the UE 108a-m may be configured to run various operating systems, such as Microsoft® Windows®, Mac OS®, Google® Chrome®, Linux®, Unix®, or any mobile operating system, including Symbian®, Palm®, Windows Mobile®, Google® Android®, Mobile Linux®, and so on. Any of the network controller devices 110a-c, or any of the base stations 106a-e may employ any number of common server, desktop, laptop, and personal computing devices.

In some embodiments, any of the UE 108a-m may be associated with any combination of common mobile computing devices (e.g., laptop computers, tablet computers, cellular phones, handheld gaming units, electronic book devices, personal music players, MiFi™ devices, video recorders, and so on), having wireless communications capabilities employing any common wireless data communications technology, including, but not limited to: GSM, UMTS, 3GPP LTE, LTE Advanced, WiMAX, and so on.

In some embodiments, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments described herein, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
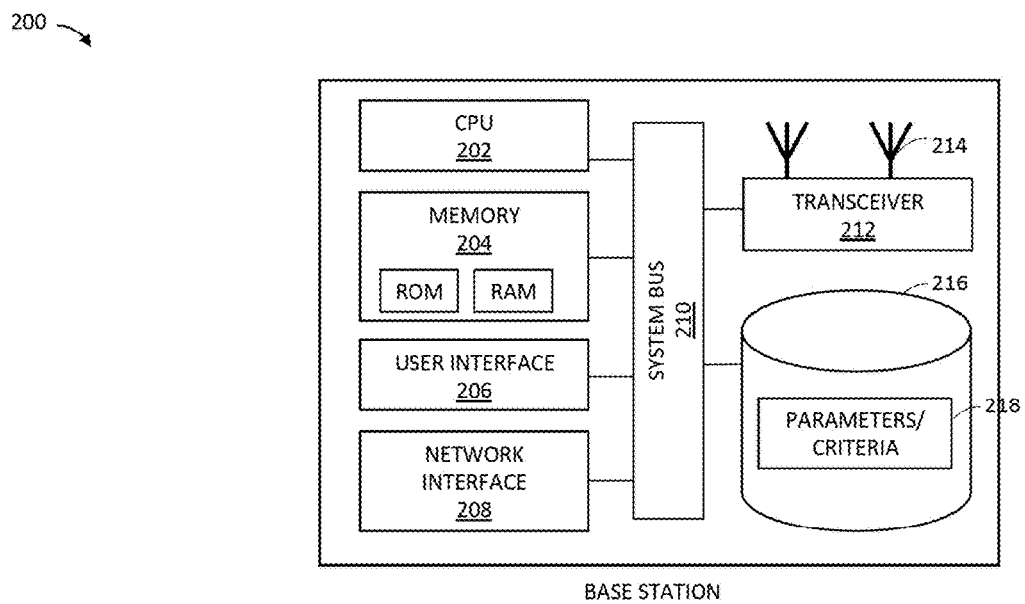
FIG. 2 is a block diagram illustrating a network resource controller.

FIG. 2 illustrates a block diagram of a base station 200 (e.g., a femtocell, picocell, microcell or macrocell) that may be representative of the base stations 106a-e in FIG. 1. In some embodiments, the base station 200 includes at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and nonvolatile (ROM) system memories 204.

The base station 200 may include a user interface 206 for inputting and retrieving data to and from the base station by operator personnel, and a network interface 208 coupled to a wireline portion of the network. Meanwhile, the base station 200 wirelessly sends and receives information to and from UE through a transceiver 212, which is equipped with one or more antenna 214.

The base station 200 may further include a system bus 210 and data storage 216. The system bus facilitates communication between the various components of the base station 200. For example, the system bus 210 may facilitate communication between a program stored in data storage 216 and the CPU 202, which executes the program. In some embodiments, data storage 216 may store parameters 218 for the base station 200, such as parameters identifying the geographical or network location of the base station 200, parameters identifying one or more carrier frequencies or operating bands via which the base station 200 operates, parameters identifying hierarchical relationships within the network between the base station 200 and other base stations (e.g., between the base station and neighboring cells), parameters associated with load-balancing or other performance metrics, and so on. In addition, data storage 216 may include an operating system, and various programs related to the operation of the base station 200.

In various embodiments, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, and so on) to send and receive information to and from UE through the transceiver 212. Additionally, the base station 200 may be configured to communicate with UEs 108a-m via any Cellular Data Communications Protocol, including any common GSM, UMTS, WiMAX or LTE protocol.

Figure 3:
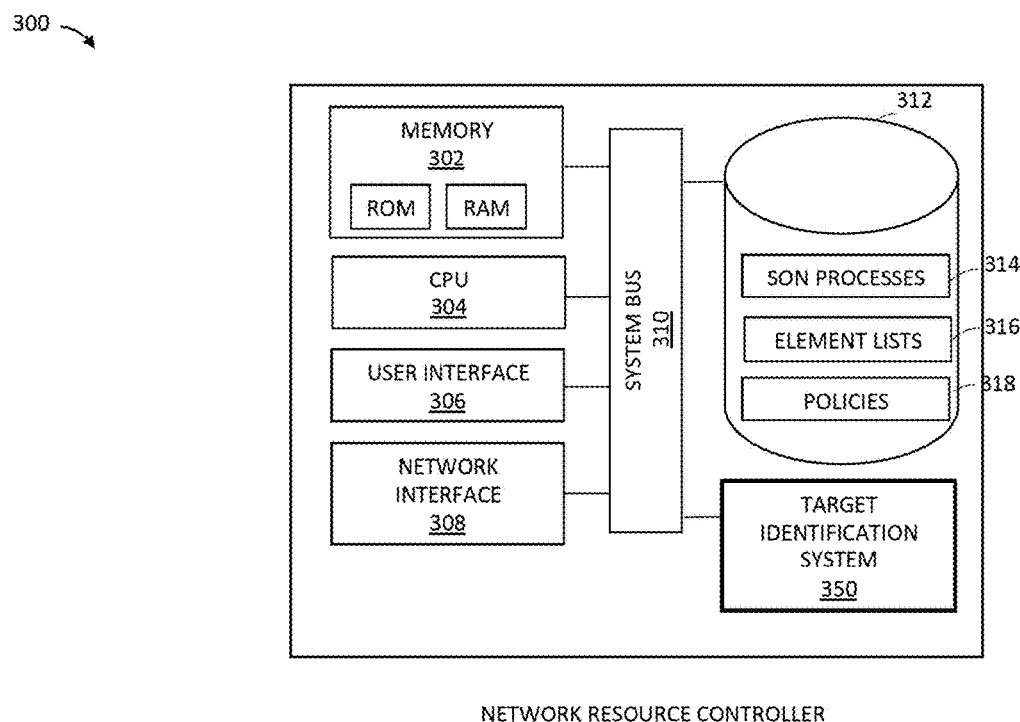
FIG. 3 is a block diagram illustrating a base station.

FIG. 3 illustrates a block diagram of an NRC 300 that may be representative of any of the network controller devices 110a-c. In some embodiments, one or more of the network controller devices 110a-c are self-optimizing or self-organizing network (SON) controllers. The NRC 300 includes one or more processor devices including a central processing unit (CPU) 304. The CPU 304 may include an arithmetic logic unit (ALU) (not shown) that performs arithmetic and logical operations and one or more control units (CUs) (not shown) that extracts instructions and stored content from memory and then executes and/or processes them, calling on the ALU when necessary during program execution.

The NRC 300 may also include a user interface 306 that allows an administrator to interact with the NRC's software and hardware resources and to display the performance and operation of the networked computing system 100. In addition, the NRC 300 may include a network interface 308 for communicating with other components in the networked computer system, and a system bus 310 that facilitates data communications between the hardware resources of the NRC 300.

In addition to the network controller devices 110a-c, the NRC 300 may be used to implement other types of computer devices, such as an antenna controller, an RF planning engine, a core network element, a database system, and so on. Based on the functionality provided by an NRC, the storage device of such a computer serves as a repository for software and database thereto.

The CPU 304 is responsible for executing computer programs stored on volatile (RAM) and nonvolatile (ROM) memories 302 and a storage device 312 (e.g., HDD or SSD). In some embodiments, the storage device 312 may store program instructions as logic hardware such as an ASIC or FPGA. The storage device 312 may include stored network optimization processes 314, element lists 316 (e.g., target network element lists for SON automation processes, temporary element lists for newly added elements, and so on), policies 318 (e.g., automation process policies associated with rules or algorithms that control, manage, and/or monitor the self-optimization and/or self-organization of the network 102 and network elements), and so on.

SON optimization processes may perform various functions when optimizing the performance and/or configuration of the network 102. For example, SON processes may include self-configuration of base stations (e.g., configuration of emission power and/or antenna tilt) in response changes to a network, self-optimization of configuration parameters of the base stations, cells, and other network elements (e.g., automatic neighbor relationship (ANR)

parameter optimization, random access parameter optimization, handover parameter optimization, self-healing of network elements (e.g., adjusting parameters within functioning base stations to compensate for non- or poor-functioning base stations), and so on.

In some embodiments, the NRC 300 includes a target identification system 350 that includes components configured to dynamically target the optimization of network elements within the network 102. For example, the target identification system 350 may include components that compare various element lists 316 to automation process policies 318 for the network 102 in order to target the SON automation processes 314 to network elements that are newly added to the network 102, such as added after certain SON processes are initiated and/or running on the network 102.

Examples of Dynamic Optimization of Network Elements

Figure 4:
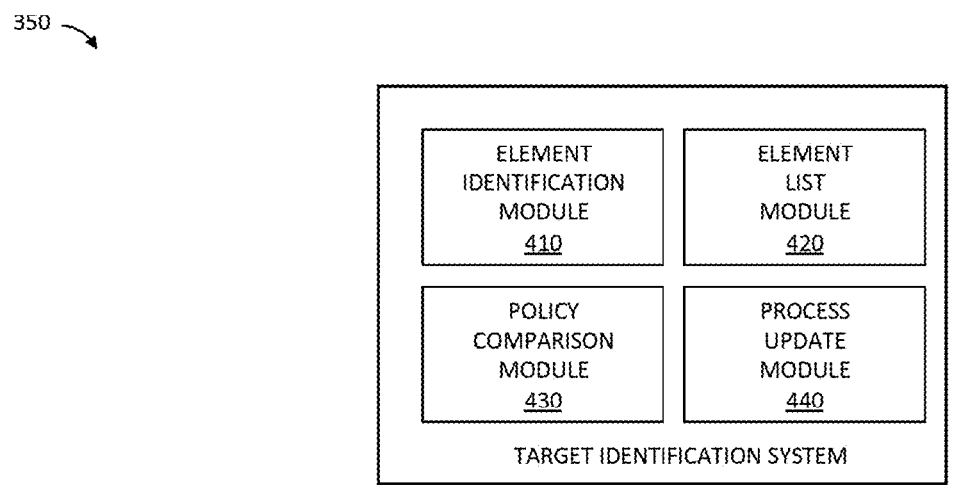
FIG. 4 is a block diagram illustrating the components of a target identification system.

As described herein, in some embodiments, the target identification system 350 includes components that dynamically consider or incorporate newly added network elements (e.g., base stations or cells) as targets of automation and optimization processes. FIG. 4 is a block diagram illustrating the components of the target identification system 350. The target identification system 350 may include one or more modules and/or components to perform one or more operations of the target identification system 350. The modules may be hardware, software, or a combination of hardware and software, and may be executed by one or more processors. For example, the target identification system 350 may include an element identification module 410, an element list module 420, a policy comparison module 430, and a process update module 440.

In some embodiments, the element identification module 410 is configured and/or programmed to identify one or more network elements that are newly added to a network that is associated with currently running automated network optimization processes. For example, the element identification module 410 may monitor the network 102 to identify newly added network elements and/or may receive an alert message from the network 102 that identifies newly added network elements.

In some embodiments, the element list module 420 is configured and/or programmed to group the identified one or more network elements into temporary element lists that are based on shared criteria and/or parameters for the one or more network elements. For example, the element list module 420 may add the identified one or more network elements to geo-location lists based on geographical locations of the one or more network elements, may add the identified one or more network elements to co-channel lists based on carrier frequencies of the one or more network elements, and/or may add the identified one or more network elements to supervisory network lists based on a network hierarchy associated with the one or more network elements.

The storage 312, therefore, may include or store various different temporary elements lists 314 that identify newly added network elements, such as a first list or lists of geographically related elements, a second list or lists of elements related within a hierarchy, and/or a third list or lists of elements that share a common carrier frequency, and so on.

In some embodiments, the policy comparison module 430 is configured and/or programmed to compare information associated with the identified one or more elements and/or the temporary element lists to element inclusion policies of the automated network optimization processes. For example, the policy comparison module 430 may compare the parameters and/or criteria associated with the one or more elements and/or information contained in the temporary element lists to inclusion policies for multiple network optimization processes currently running for the network, such as polices that relate management clusters of network elements to certain automation processes utilized during optimization of the network 102 and targeted to the management clusters. A management cluster may be any arbitrary grouping of network elements, such as groupings according to coverage locations (e.g., a highway corridor, a city, a building or campus, and so on). The management cluster, therefore, may be a group or cohort of network elements suitable for collective management and/or optimization by automated SON processes targeted to specific functions and/or optimization goals.

In some embodiments, the process update module 440 is configured and/or programmed to update the automated network optimization processes based on the comparison. For example, the process update module 440 may update a target network element list with information identifying the one or more network elements that is contained in the temporary element lists, and target the automated network optimization processes to network elements contained in the updated target network element list. Thus, the process update module 440 may add the identified one or more network elements as targets for network optimization processes that are initiated before the one or more network elements are added to the network.

In some embodiments, the element list module 420 may remove the identified one or more network elements from the temporary element lists after the automated network optimization processes are updated by the process update module 440 to contain the identified one or more network elements as target network elements.

In some embodiments, the process update module 440 may terminate on-going optimization processes and re-launch the optimization processes with the redefined targets (e.g., defined in the updated target element list), such as when new network elements are detected and meet optimization policy criteria.

Figure 5:
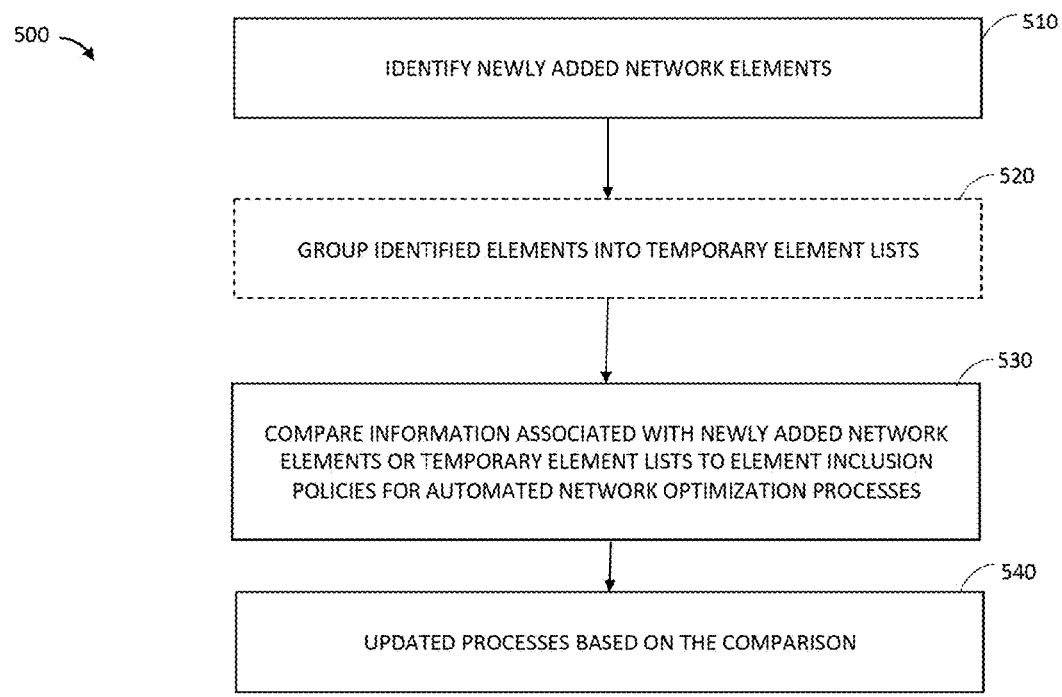
FIG. 5 is a flow diagram illustrating a method for targeting the optimization of a network to newly added elements.

As described herein, the target identification system 350 may perform various algorithms, routines, and/or methods when dynamically targeting optimization processes (SON processes such as ANR) to new network elements on a network. FIG. 5 is a flow diagram illustrating a method 500 for targeting the optimization of a network to newly added elements. The method 500 may be performed by the target identification system 350 and, accordingly, is described herein merely by way of reference thereto. It will be appreciated that the method 500 may be performed on any suitable hardware.

In operation 510, the target identification system 350 identifies one or more network elements that are newly added to a network that is associated with currently running automated network optimization processes. For example, the element identification module 410 may monitor the network 102 to identify newly added network elements and/or may receive an alert message from the network 102 that identifies newly added network elements.

Optionally, in operation 520, the target identification system 350 groups the identified one or more network elements into temporary element lists that are based on shared parameters for the one or more network elements. For example, the element list module 420 may add the identified one or more network elements to geo-location lists based on geographical locations of the one or more network elements, may add the identified one or more network elements to co-channel lists based on carrier frequencies of the one or more network elements, and/or may add the identified one or more network elements to supervisory network lists based on a network hierarchy associated with the one or more network elements.

In operation 530, the target identification system 350 compares the identified one or more network elements and/or the temporary element lists to element inclusion policies of the automated network optimization processes. For example, the policy comparison module 430 may compare the identified one or more network elements and/or the temporary element lists to inclusion policies for multiple network optimization processes currently running for the network, such as polices that relate management clusters of network elements to certain automation processes utilized during optimization of the network 102 and targeted to the management clusters.

In operation 540, the target identification system 350 updates the automated network optimization processes based on the comparison. For example, the process update module 440 may update a target network element list with information identifying the one or more network elements, such as elements contained in the temporary element lists, and target the automated network optimization processes to network elements, such as elements contained in the updated target network element lists. Thus, the process update module 440 may add the identified one or more network elements as targets for network optimization processes that are initiated before the one or more network elements are added to the network.

In some embodiments, the target identification system 350 may remove or delete the identified one or more network elements from the temporary element lists after the automated network optimization processes are updated to contain the identified one or more network elements as target network elements. Therefore, once the target element lists associated with running network optimization processes are updated, the temporary element lists and/or contents of the temporary element lists are removed or deleted. The target identification system 350 may then update or generate new lists in response to additional elements being newly added to the network 102.

Figure 6:
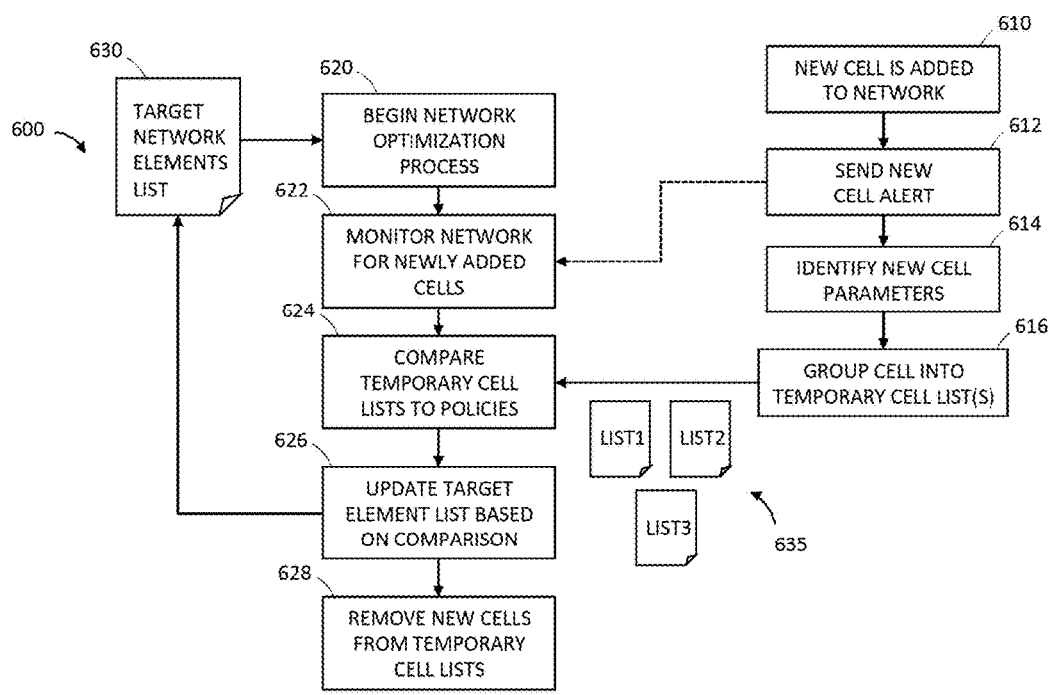
FIG. 6 is a flow diagram illustrating a method for performing automated network optimization processes for cells that are newly added to a network.

Thus, in some embodiments, the target identification system 350 utilizes parameters or criteria associated with cells and/or network elements to generate temporary lists of common or group cells and target running automation processes to the common or grouped cells. FIG. 6 is a flow diagram illustrating a method 600 for performing automated network optimization processes for cell sites that are newly added to a network.

In operation 610, a new cell is added to a network. In operation 612, the network sends a new cell alert to the NRC 300. In operation 614, the target identification system 350 identifies the parameters associated with the new cell, such as parameters identifying the geographical location (e.g., latitude, longitude, or other position information), carrier frequency, network hierarchy (e.g., node positioning, co-location of cells, the serving RNC or other supervisory element), configuration, and/or other parameters associated with the new cell. In operation 616, the target identification system 616 adds or groups the new cell into one or more temporary cell lists 635, such as the lists 316 stored in storage 312.

At some time before the new cell was added to the network, the NRC 300 may have initiated the automated network optimization processes 314 on the network, such as SON optimization processes. Thus, in operation 620, the network begins running network optimization processes that target network elements (e.g., elements listed in a target network element list 630). In operation 622, the target identification system 350 monitors the network for newly added cells, and receives an alert message indicating the new cell was added to the network.

In operation 624, the target identification system 350 compares the temporary cell lists 635 to the target network element list 630, and, in operation 626, updates the target network element list 630 based on the comparison. In operation 628, the target identification system 350 may remove the newly added cell from the temporary cell lists 635.

Thus, in some embodiments, the target identification system 350 generates temporary lists of new cells within a network that were added to the network after a set of self-optimizing network processes were initiated within the network, each of the generated temporary lists grouping cells according to a common criterion, such as a certain geographical location that includes a cell, a certain carrier frequency via which a cell operates, and/or a hierarchy of cells within the network within which a cell is positioned.

The target identification system 350 then compares the temporary lists to target cell lists that group the cells within the network into management clusters, the management clusters being associated with at least one self-optimizing network process of the set of self-optimizing network processes, and updates the target cell lists to include new cells based on a comparison of the temporary lists to the target cell lists, which enables running optimization processes to target and include the newly added cells.

Figure 7A:
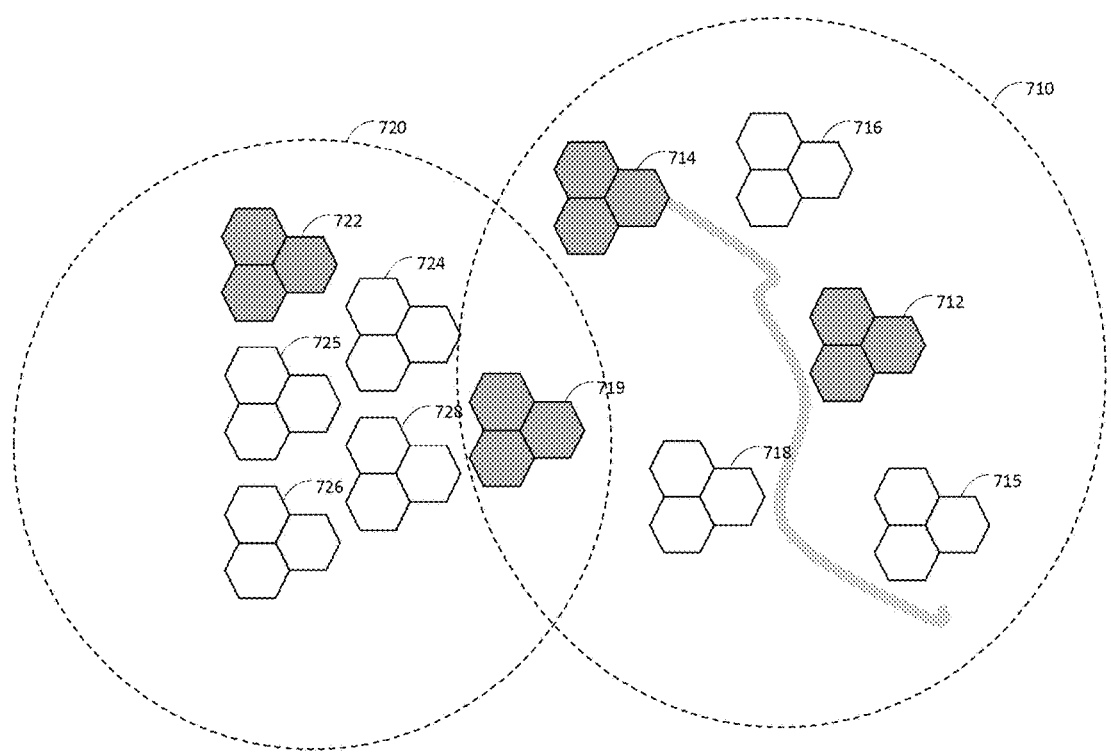
FIGS. 7A-7D are schematic diagrams illustrating an example scenario of performing automated network optimization processes for newly added cells.

FIGS. 7A-7D illustrate an example of performing automated network optimization processes for newly added cells. FIG. 7A depicts cells grouped into a first management cluster 710 ("management cluster A" which is along a highway) and a second management cluster 720 ("management cluster B" which is a suburb next to the highway). For example, management cluster A includes known or current cells 715, 716, and 718 (on which SON optimization processes are running), as well as newly added cells 712, 714, and 719, and management cluster B includes known or current cells 724, 725, 726 and 728 (on which the SON optimization processes are running), as well as newly added cells 719 and 722.

Figure 7B:
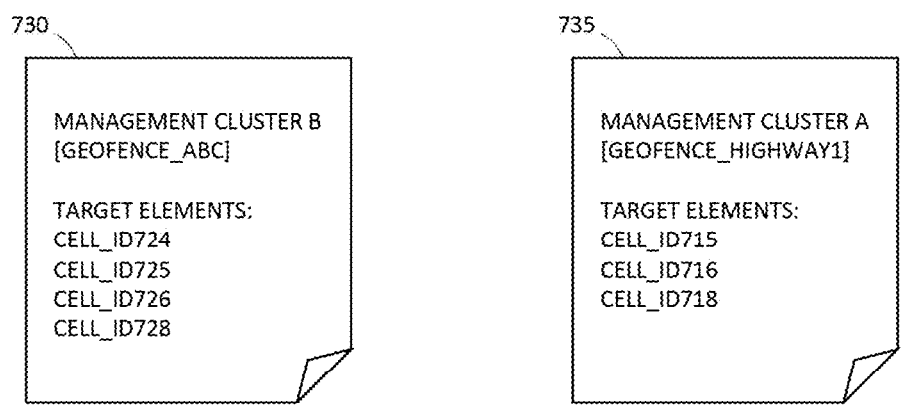

FIG. 7B depicts network element lists for each of the management clusters (e.g., lists which identify the known target cells for SON optimization processes). For example, the network element list 730 includes a list of cell identifiers associated with management cluster B, and the target network element list 735 includes a list of cell identifiers associated with management cluster A.

Figure 7C:
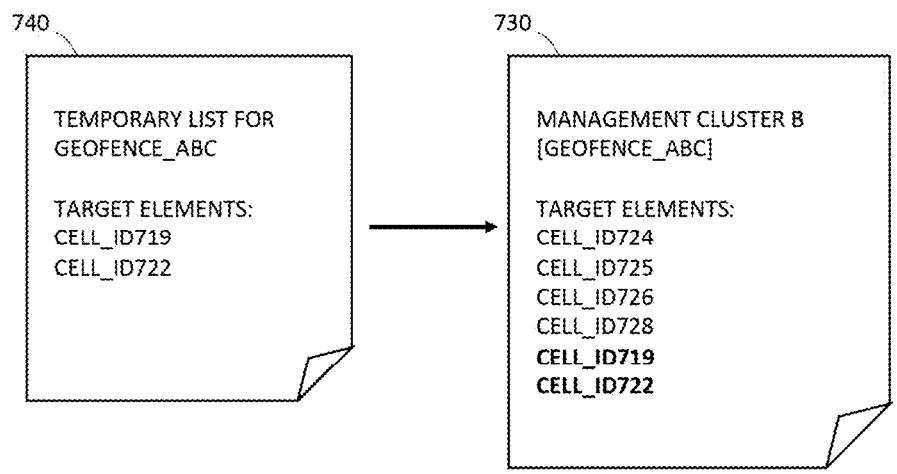

FIG. 7C depicts a temporary cell list 740 generated by the target identification system 350 for the newly added cells having parameters indicating the geographical locations of the cells are within the geo-fence associated with the management cluster B. In response to the methods performed by the target identification system 350, the temporary cell list 740 is compared to automation policies, and the network element list 735 is updated to include the newly added cells 719 and 722.

Figure 7D:
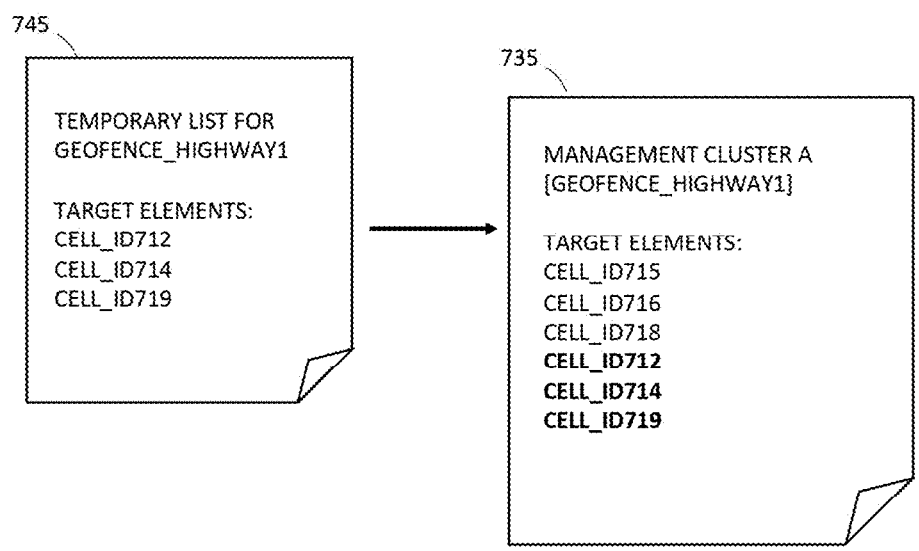

FIG. 7D depicts a temporary cell list 745 generated by the target identification system 350 for the newly added cells having parameters indicating the geographical locations of the cells are within the geo-fence associated with the management cluster. In response to the methods performed by the target identification system 350, the temporary cell list 740 is compared to automation policies, and the network element list 735 is updated to include the newly added cells 712, 714, and 719.

Thus, the automated network optimization processes currently running with respect to cells within the management clusters 710 and 720 will target the newly added cells, enabling the self-optimization and/or self-organization of the network to expand its scope to include all current or newly added network elements, among other things.

Although aspects of the present technology have been described with respect to specific examples, embodiments of the present technology are not limited by these examples. For example, persons of skill in the art will recognize that pre-delivering content to user devices may be performed according to various other algorithms and processes without departing from the scope or spirit of the present technology.

What is claimed is:

1. A method, comprising:
   adding a new cell to a wireless communications network;
   identifying, by a network resource controller, the newly added cell;
   determining one or more parameters of the newly added cell that are associated with currently running automated network optimization processes;
   comparing the one or more parameters of the newly added cell to element inclusion policies of the automated network optimization processes; and
   updating the automated network optimization processes based on the comparison,
   wherein the element inclusion policies are policies that determine whether the newly added cell will be a target of each of the automated network optimization processes.

2. The method of claim 1, wherein updating the automated optimization processes based on the comparison includes:
   updating a network element list with information identifying the one or more newly added cell; and
   targeting the automated network optimization processes to the one or more newly added cell contained in the updated network element list.

3. The method of claim 1, wherein updating the automated network optimization processes based on the comparison includes updating self-optimizing network (SON) processes for cells within the network.

4. The method of claim 1, wherein updating the automated network optimization processes based on the comparison includes updating automatic neighbor relation (ANR) processes for cells within the network.

5. The method of claim 1, further comprising:
   adding the newly added cell to a temporary element list that is based on shared criteria by adding the newly added cell to a geo-location list based on a geographical location of the newly added cell; and
   wherein comparing the one or more characteristics of the newly added cell to element inclusion policies of the automated network optimization processes includes comparing the temporary element list to the element inclusion policies.

6. The method of claim 1, further comprising:
   adding the newly added cell to a temporary element list that is based on shared parameters of cells in the network by adding the newly added cell to a co-channel list based on a carrier frequency of the newly added cell; and
   wherein comparing the one or more newly added cell to element inclusion policies of the automated network optimization processes includes comparing the temporary element list to the element inclusion policies.

7. The method of claim 1, further comprising:
   adding the newly added cell to a temporary element list that is based on shared parameters of cells in the network by adding the newly added cell to a supervisory network list based on a network hierarchy associated with the newly added cell; and
   wherein comparing the one or more newly added cell to element inclusion policies of the automated network optimization processes includes comparing the temporary element list to the element inclusion policies.

8. The method of claim 1, wherein comparing the newly added cell to element inclusion policies of the automated network optimization processes includes comparing the newly added cell to inclusion policies for multiple network optimization processes currently running for the network.

9. The method of claim 1, wherein detecting the newly added cell includes receiving an alert message at the network resource controller that identifies the newly added cell.

10. The method of claim 1, wherein updating the automated network optimization processes based on the comparison includes adding the newly added cell as a target for network optimization processes that are initiated before the newly added cell is added to the network.

11. The method of claim 1, further comprising:
    adding the newly added cell to a temporary element list that is based on shared parameters of cells in the network includes adding the newly added cell to a first list of geographically related elements, a second list of elements related within a hierarchy, and a third list of cells that share a common carrier frequency; and
    wherein comparing the one or more newly added cell to element inclusion policies of the automated network optimization processes includes comparing the temporary element lists to the element inclusion policies.

12. A network resource controller in a wireless communications network in which automated network optimization processes are currently running, the network resource controller comprising:
    a processor; and
    a non-transitory computer-readable storage medium whose contents, when executed by the processor, cause the network resource controller to perform the following operations:
    identifying a cell that is newly added to the network;
    determining one or more parameters of the newly added cell;
    comparing the one or more parameters of the newly added cell to element inclusion policies of the automated network optimization processes; and
    updating the automated network optimization processes based on the comparison,
    wherein the element inclusion policies are policies that determine whether the newly added cell will be a target of each of the automated network optimization processes.

13. The system of claim 12, wherein updating the automated optimization processes includes:
    updating a network element list with information associated with the newly added cell that is contained in temporary element lists; and
    targeting the automated network optimization processes to the one or more newly added cell contained in the updated network element list.

14. The system of claim 12, wherein updating the automated network optimization processes based on the comparison includes updating one or more self-optimizing network (SON) processes for cells within the network.

15. The system of claim 12, wherein updating the automated network optimization processes based on the comparison includes updating one or more automatic neighbor relation (ANR) processes for cells within the network.

16. The system of claim 12, wherein the operations performed by the processor further include:
adding a plurality of newly added cells to one or more geo-location list based on geographical locations of the plurality of newly added cells; and
comparing the one or more geo-location list to element inclusion policies of the automated network optimization processes.

17. The system of claim 12, further comprising:
adding a plurality of newly added cells to one or more co-channel lists based on carrier frequencies of the plurality of added cells; and
comparing the one or more co-channel list to element inclusion policies of the automated network optimization processes.

18. The system of claim 12, further comprising:
adding a plurality of newly added cells to one or more supervisory network lists based on a network hierarchy associated with the plurality of newly added cell; and
comparing the one or more supervisory network lists to element inclusion policies of the automated network optimization processes.

19. A non-transitory computer-readable storage medium whose contents, when executed by a computing system, cause the computing system to perform operations, the operations comprising:
generating temporary lists of new cells within a network that were added to the network after a set of self-optimizing network processes were initiated on cells within the network, each of the generated temporary lists grouping cells according to a common parameter;
comparing the temporary lists to cell lists that group the cells within the network into management clusters, each of the management clusters being a target for least one self-optimizing network process of the set of self-optimizing network processes; and
updating the cell lists for management clusters to include new cells based on a comparison of the temporary lists to the target cell lists,
wherein the common parameter is a certain geographical location that includes a cell, a certain carrier frequency via which a cell operates, or a hierarchy of cells within the network within which a cell is positioned.

20. The non-transitory computer-readable storage medium of claim 19, wherein the management clusters include a plurality of management clusters, each management cluster being associated with at least one characteristic that is common to every cell in the management cluster, and
and wherein all cells in each management cluster are collectively managed by an automated optimization process element that is exclusive to the cells in the management cluster.

* * * * *